(12) United States Patent
Kowatzki

(10) Patent No.: US 9,421,902 B2
(45) Date of Patent: Aug. 23, 2016

(54) MOTOR VEHICLE COMPRISING A PLURALITY OF LIGHTS TO ILLUMINATE THE AREA SURROUNDING THE VEHICLE TO THE SIDE OR REAR

(71) Applicant: Audi AG, Ingolstadt (DE)

(72) Inventor: Stefan Kowatzki, Stammham (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/763,079

(22) PCT Filed: Jan. 20, 2014

(86) PCT No.: PCT/EP2014/000136
§ 371 (c)(1),
(2) Date: Jul. 23, 2015

(87) PCT Pub. No.: WO2014/114439
PCT Pub. Date: Jul. 31, 2014

(65) Prior Publication Data
US 2015/0353000 A1 Dec. 10, 2015

(30) Foreign Application Priority Data

Jan. 23, 2013 (DE) ........................ 10 2013 001 086

(51) Int. Cl.
*B60Q 1/00* (2006.01)
*H05B 37/02* (2006.01)
*B60Q 1/30* (2006.01)
*B60Q 1/32* (2006.01)
*B60Q 1/26* (2006.01)
*B60Q 1/24* (2006.01)

(52) U.S. Cl.
CPC .............. *B60Q 1/0094* (2013.01); *B60Q 1/24* (2013.01); *B60Q 1/2661* (2013.01); *B60Q 1/2665* (2013.01); *B60Q 1/2669* (2013.01); *B60Q 1/2696* (2013.01); *B60Q 1/30* (2013.01); *B60Q 1/323* (2013.01); *H05B 37/0227* (2013.01); *B60Q 2400/40* (2013.01)

(58) Field of Classification Search
None
See application file for complete search history.

(56) References Cited

U.S. PATENT DOCUMENTS

| 4,972,173 A * | 11/1990 | Raciti | B60Q 1/323 340/468 |
| 6,416,208 B2 | 7/2002 | Pastrick et al. | |
| 6,509,832 B1 * | 1/2003 | Bauer | B60Q 1/0023 340/425.5 |
| 6,587,573 B1 * | 7/2003 | Stam | B60Q 1/085 340/930 |

(Continued)

FOREIGN PATENT DOCUMENTS

| DE | 198 05 771 | 8/1999 |
| DE | 100 34 379 | 1/2002 |

(Continued)

OTHER PUBLICATIONS

International Search Report issued by the European Patent Office in International Application PCT/EP2014/000136 on May 15, 2014.

*Primary Examiner* — Crystal L Hammond
(74) *Attorney, Agent, or Firm* — Henry M. Feiereisen LLC

(57) ABSTRACT

A motor vehicle includes a plurality of lights serving to illuminate the area surrounding the vehicle to the side or rear, wherein one or more sensors are provided to detect the position of a person relative to the vehicle. The lights, of which several are installed in the region of a vehicle side or the vehicle rear and illuminate the different surrounding area regions, can be activated separately depending on the detected position.

18 Claims, 1 Drawing Sheet

(56) References Cited

U.S. PATENT DOCUMENTS

| | | | |
|---|---|---|---|
| 8,098,157 B2* | 1/2012 | Saunders | G08B 5/38 340/541 |
| 8,764,256 B2* | 7/2014 | Foote | B60R 1/12 362/494 |
| 2005/0007789 A1 | 1/2005 | Schenk | |
| 2006/0044800 A1* | 3/2006 | Reime | B60Q 3/001 362/276 |
| 2007/0053195 A1* | 3/2007 | Alberti | B60Q 1/2665 362/494 |
| 2009/0027185 A1* | 1/2009 | Daura Luna | B60Q 9/008 340/463 |
| 2011/0241544 A1* | 10/2011 | Murray | B60Q 1/323 315/77 |
| 2012/0081915 A1* | 4/2012 | Foote | B60R 1/12 362/494 |
| 2012/0320613 A1* | 12/2012 | Singhal | B60Q 1/06 362/487 |
| 2013/0229518 A1* | 9/2013 | Reed | H05B 37/0227 348/148 |
| 2014/0097748 A1* | 4/2014 | Kato | B60Q 3/0293 315/77 |
| 2014/0191859 A1* | 7/2014 | Koelsch | H02J 7/0047 340/455 |
| 2014/0354179 A1* | 12/2014 | Newton | H05B 37/0227 315/297 |
| 2015/0358540 A1* | 12/2015 | Kanter | G08G 1/168 348/38 |

FOREIGN PATENT DOCUMENTS

| | | |
|---|---|---|
| DE | 103 31 582 | 1/2005 |
| DE | 102004033896 | 2/2006 |
| DE | 102005041261 | 3/2006 |
| DE | 102006033883 | 2/2007 |
| DE | 102006019284 | 10/2007 |
| DE | 102007039677 | 4/2009 |
| DE | 102010019829 | 11/2011 |
| DE | 102010034927 | 2/2012 |
| EP | 2 384 936 | 11/2011 |
| FR | 2 929 193 | 10/2009 |
| JP | 2009-57014 | 3/2009 |

\* cited by examiner

MOTOR VEHICLE COMPRISING A PLURALITY OF LIGHTS TO ILLUMINATE THE AREA SURROUNDING THE VEHICLE TO THE SIDE OR REAR

CROSS-REFERENCES TO RELATED APPLICATIONS

This application is the U.S. National Stage of International Application No. PCT/EP2014/000136, filed Jan. 20, 2014, which designated the U.S. and has been published as International Publication No. WO 2014/114439 and which claims the priority of German Patent Application, Serial No. 10 2013 001 086.1, filed Jan. 23, 2013, pursuant to 35 U.S.C. 119(a)-(d).

The invention relates to a motor vehicle, including a plurality of lights to illuminate the area surrounding the vehicle to the side and the rear.

Modern motor vehicles increasingly use lights to illuminate areas surrounding the vehicle so as to provide a person, who wants to get into or leave the vehicle, a better view in the dark. For this purpose, lights, mostly LEDs, are installed at different locations, for example in the exterior door handle or in the outside mirror, to serve as "foreground illumination". These lights are normally activated when embarking or disembarking and deactivated again after elapse of a specified time or another termination criterion. In known motor vehicles, this lighting device illuminates a statically defined area, i.e. a defined ground region. The trigger function, i.e. the trigger causing the activation of the illumination, is normally the unlocking of the locked vehicle via a radio remote control, or opening of a door when getting out. The person getting in or the person getting out after closing the door, is able to recognize the conditions in the area of the illuminated region as a result of the illumination, but also only there, wherein these statically defined illuminated regions do not cover an overly large region, but primarily are defined in immediate proximity of the side doors or, optionally, in the area the hatchback.

SUMMARY OF THE INVENTION

The invention is thus based on the problem to provide a motor vehicle which enables improved illumination of the area surrounding the vehicle.

This problem is solved in accordance with the invention in a motor vehicle of the aforementioned type by providing one or more sensors for detecting the position of a person in relation to the vehicle, and by activating the lights, of which several are installed in the region of a vehicle side or vehicle rear to illuminate different surrounding areas, separately in dependence on the detected position.

According to the invention, the sensors afford the possibility to detect the position of a person approaching the vehicle or walking away from the vehicle. Based on this position information, it is now possible to activate at least one particular light via a suitable control device, with several, at least two, separate lights being installed on each vehicle side or in the area of the vehicle rear. The lights associated to one side or the rear region illuminate the different regions. When the position of an approaching or departing person is now known, it is possible, for example, to activate the light that has an illumination area which is defined in the vicinity of the position. I.e. the corresponding light relating to the position of the person can be activated, wherein each light can be activated separately. Since the lights illuminate different regions, there is hence no longer any static foreground illumination, rather the foreground can be flexibly illuminated.

Regarding the type of illumination, different possibilities are conceivable. According to a first alternative of the invention, the position of the person can be detected continuously, wherein the activation of the lights can be changed in dependence on the continuously detected position. According to this configuration of the invention, the foreground or surrounding illumination is "tracked", it varies depending on the changing position of the person. For example, when the person approaches the motor vehicle and the person has unlocked the vehicle via radio communication, the sensor detects a first position information, whereupon a first light is activated, which illuminates a more remote region. The latter becomes visible for the person. With increasing proximity and thereby change in position, which is detected continuously, a second light is activated to provide better illumination with respect to the new position of the person, etc. I.e., the illumination of the surroundings tracks the person or the path of the person, with this "tracking" being, of course, more variable, the more lights are installed.

An alternative mode of activation involves an activation of the lights, once the position of the person has been detected, in accordance with a defined time sequence. As a result, a "moving light" is virtually realized, with the activation sequence repeating until the person is seated in the vehicle, or, again detected by the sensor, has walked away far enough from the vehicle. The approaching person is thus detected also here via the sensor. When detecting a sufficient minimum distance of the person relative to the vehicle, the control device switches on the first light. After elapse of a certain time, for example 1-3 seconds, the second light is automatically switched on, whereupon, again after elapse of a defined time of, for example 1-3 seconds, a third light is activated, and then again the first light is activated, etc. In this way, a "moving light" is established, i.e. different surrounding areas, which, as a result of the alignment of the lights, adjoin one another or partially overlap one another, and are activated in sequence. Preferably, a previously activated light is always turned off, when a light subsequently to be activated is switched on. Also in this way, a person, approaching the vehicle for example, is able to see the surroundings in front of him across a large area. Possible obstacles etc. can be readily recognized.

The lights themselves can be installed in a side mirror and/or a door handle and/or to the hatchback, wherein at least two lights, optionally also three or four, can be installed on each side or in the area of the tail, and wherein the respective lights on the side illuminate different surrounding areas. It is conceivable for example, to install three lights in the rear view mirror, i.e. a configuration as lighting module, with the individual lights being aligned differently. The first light illuminates a distant ground region, the second light an adjacent closer ground region, and the third light an again adjacent ground region which, however, is in immediate proximity in front of the side door or the like.

The respective sensor, associated to a vehicle side or the vehicle rear, is appropriately installed there such as to have a largest possible detection range. It is also possible here to install the sensor in the side mirror, a door handle, or the hatchback, optionally adjacent thereto, or on a common module with one or more lights installed there.

As lights LEDs are suitably used, which, on one hand, are very compact and thus can easily be installed at the specified positions, and several thereof can also easily be integrated in a common module, and which, on the other hand, have a high luminosity and therefore are able to illuminate the respective area sufficiently bright.

In the area of a vehicle side or the vehicle rear, several, in particular at least three, lights can be installed which can be activated separately in dependence on the detected position and illuminate different surrounding areas adjoining each other or partially overlapping each other. The lights can hereby illuminate surrounding areas that lie at different distances from the motor vehicle. In particular, a first, a second and a third light may be provided, with the first light illuminating a first surrounding area distant from the motor vehicle, the second light illuminating a second surrounding area adjoining the first surrounding area and in closer proximity to the motor vehicle, and the third light illuminating a third surrounding area adjoining the second surrounding area and next to the motor vehicle.

BRIEF DESCRIPTION OF THE DRAWING

Further advantages, features and details of the invention will become apparent from the exemplary embodiment described hereinafter and with reference to the drawings. It is shown in.

DETAILED DESCRIPTION OF PREFERRED EMBODIMENTS

Figure 1:
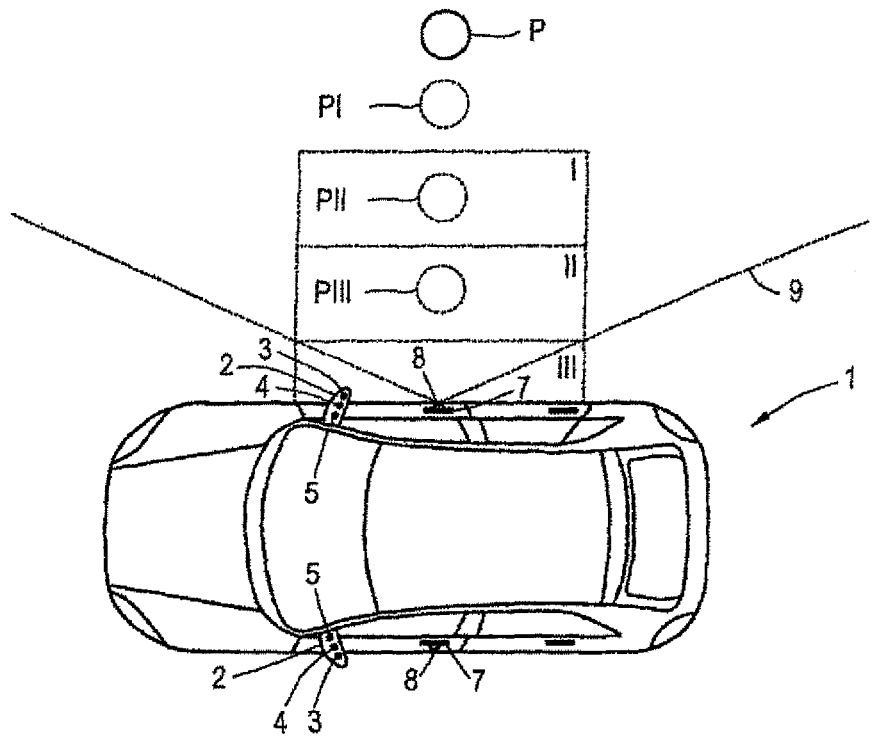
FIG. 1 a principal illustration of a motor vehicle according to the invention, and FIG. 2 a principal illustration of the essential components of the ambient illumination according to the invention.

FIG. 1 shows a motor vehicle 1 according to the invention, in which an ambient illumination is installed, which allows a dynamic illumination of the area surrounding the proximity of the vehicle. In the illustrated exemplary embodiment, a plurality of individual lights 3, 4, 5 are installed on each vehicle side in the respective side mirror 2 and respectively involve individual LEDs that can be activated separately, i.e. each individual light can be operated individually and separately. The lights 3, 4, 5 are arranged, for example, as a common lighting module on a common carrier and installed as a single-piece unitary structure in the respective side mirror 2. They are located on the mirror base, and shown in FIG. 1 merely by way of example in the side mirror 2.

Figure 2:
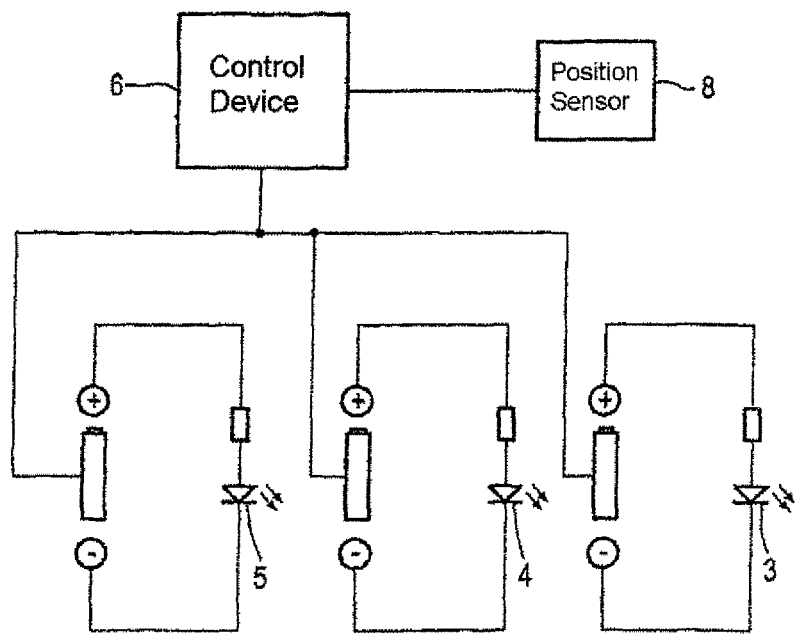

Activation of the individual lights 3, 4, 5 is realized via a common control device 6, which is associated either to only one lighting module, i.e. the lights on only one vehicle side, but may also be able to activate both lighting modules on the different vehicle sides. As is apparent from the principal illustration according to FIG. 2, power supply for the individual lights is switched on or switched off via the control device 6, with the respective circuit being, of course, appropriately configured.

Installed on each vehicle side in the respective side handle 7 is a position sensor 8 to detect the position of a person P, shown in FIG. 1 by way of example by dashed line 9 and located in the detection field of the position sensor. This position sensor 8 communicates with the control device 6, i.e. it supplies its detection information, with the control device 6 deriving therefrom, for example, corresponding position information, unless this has been established already on the sensor side.

With reference to FIG. 1, there is shown, by way of example, the mode of operation of the motor vehicle according to the invention, when the person P approaches. As indicated by the solid symbol, designated with P, the person is located in the detection range of the position sensor 8, however the person is still too far away from the motor vehicle in order to activate one of the lights 3, 4, 5, i.e. to illuminate the area surrounding the vehicle next to the vehicle side. The person P now approaches the vehicle 1. As soon as the person has reached the position designated with PI, a detection result is transmitted by the position sensor 8 to the control device 6. The person is situated here in a position relative to the motor vehicle that requires a first illumination. For this purpose, the control device 6 activates the light 3, i.e., the corresponding LED, which is installed on the module or in the side mirror 3 in such a way as to illuminate the ground region, designated, by way of example, with I. This ground region is located in front of the person so as to be able to see the immediate further path well.

The position sensor 8 continuously detects the position of the person P, who, it is assumed, further approaches the vehicle. When the person reaches the position PII, this information is immediately transmitted to the control device 6 which recognizes then the need for a change in the illumination of the surroundings and thus activates the light 4 to light up, while the light 3 is deactivated. The light 4, i.e., the corresponding LED, is aligned at a slightly different angle or in a different position, compared with the light 3, so that the light 4 illuminates the ground region which is designated with II and again is in front of the person located in the position PII.

When now continuing to move toward the motor vehicle 1, the person reaches the position which is designated with PIII and which again is detected by the position sensor 8 and communicated to the control device 6. The latter then deactivates the light 4 and simultaneously switches on the light 5, i.e. the corresponding LED, which again is installed at slightly different alignment. The light 5 is capable to illuminate the ground region which is designated with III and situated in immediate proximity of the vehicle so as to enable the person to see this ground region. As soon as the person then opens the motor vehicle, which has been unlocked beforehand via a radio transmitter for example or has been unlocked by another person, through opening of the side door, the previously operated light 5 switches off for example, so that the illumination of the surroundings is terminated. It is also no longer needed, when the person is in the process of getting in.

The dynamic activation and deactivation of individual lights thus enables a dynamic foreground illumination or ambient illumination, which is aligned with respect to the position of a person or its change in position, so that the surroundings are illuminated at any time in an optimum manner with respect to the position and illumination of remote areas becomes also possible.

When a person leaves the vehicle, illumination is implemented in a correspondingly reverse manner. After getting out and closing the vehicle door, the position sensor 8 would again recognize the position of the person in immediate proximity of the vehicle, whereupon the light 5 is initially switched on, unless it has already been activated anyway solely by opening of the door. The position of the person is continuously detected as the person moves away from the vehicle, and depending on the detected position, the light 4 is then switched on whereas the light 5 is deactivated, and finally the light 3 is switched on and the light 4 is deactivated. As soon as the person has moved sufficiently far away from the vehicle, the light 3 is deactivated again.

The afore-described exemplified scenarios enable a dynamic ambient illumination with continuous position detection of the change in position of the person. It is also conceivable to realize the illumination dynamically in the absence of a continuous position detection. Assuming the exemplified scenario of FIG. 1, as the person approaches the motor vehicle, the light 5 is switched on, when, for example, the position of person, designated with PI, is detected. It lights up for a specified time, for example, two seconds, after which it is deactivated and the light 4 is switched on, which, in turn, lights up for two seconds for example, after which it is deactivated and the light 3 is switched on, which, in turn, lights up for two seconds for example, after which it is deactivated and light 3 is again switched on, etc. This means that a defined chronological sequence is executed by the control device 6, i.e. the individual lights are alternatingly activated and deactivated. As a result, a moving light is generated, i.e., the path lying ahead of the person is illuminated like a moving light.

Correspondingly, the same is applicable, of course, also when getting out, in which case the sequence commences with the light 5.

Although all three lights 3, 4, 5 are installed on a side mirror in the illustrated exemplary embodiment, it would, of course, be conceivable to position the lights also in a different arrangement in the region of a vehicle side. Basically, however, is that a different illumination area is associated to each light.

What is claimed is:

1. A motor vehicle, comprising:
   a sensor configured to detect a position of a person relative to the motor vehicle; and
   at least three lights mounted in an area of a side or rear of the motor vehicle and configured to separately and sequentially illuminate at least three different regions which surround the vehicle to the side and the rear in dependence on a position detected by the sensor and which adjoin one another or partly overlap one another, with a first one of the three regions being distant to the motor vehicle and illuminated by a first one of the lights, with a second one of the three regions that is adjacent to the first one of the regions being closer to the motor vehicle and illuminated by a second one of the lights, and with a third one of the three regions that is adjacent to the second one of the regions adjoining the motor vehicle and illuminated by a third one of the lights.

2. The motor vehicle of claim 1, wherein the sensor continuously detects the position of the person, with an activation of the lights being changeable in dependence on the continuously detected position.

3. The motor vehicle of claim 1, wherein the lights, once the sensor has detected the position of the person, are activated according to a defined time sequence.

4. The motor vehicle of claim 1, wherein the lights are installed in at least one vehicle structure selected from the group consisting of side mirror, door handle, and hatchback.

5. The motor vehicle of claim 1, wherein the sensor is installed in at least one vehicle structure selected from the group consisting of side mirror, door handle, and hatchback.

6. The motor vehicle of claim 1, wherein the lights and the sensor are installed in at least one vehicle structure selected from the group consisting of side mirror, door handle, and hatchback.

7. The motor vehicle of claim 1, wherein each of the lights is a light-emitting diode (LED).

8. The motor vehicle of claim 1, further comprising a control device receiving information from the sensor about a detected position of the person and individually activating the lights in dependence on the detected position to thereby generate a moving light.

9. The motor vehicle of claim 1, wherein the lights are installed in a side mirror of the motor vehicle, while the sensor is installed in a door handle of the motor vehicle.

10. A method, comprising:
    installing at least three lights in an area of a side or rear of a motor vehicle;
    monitoring an area surrounding the vehicle to the side and the rear for detecting the presence of a person relative to the motor vehicle; and
    sequentially illuminating at least three different regions, which surround the motor vehicle to the side and the rear in dependence on a detected position and which adjoin one another or partly overlap one another, by separately activating the at least three lights so as to produce a moving light, with a first one of the three regions being distant to the motor vehicle and illuminated by a first one of the lights, with a second one of the three regions that is adjacent to the first one of the regions being closer to the motor vehicle and illuminated by a second one of the lights, and with a third one of the three regions that is adjacent to the second one of the regions adjoining the motor vehicle and illuminated by a third one of the lights.

11. The method of claim 10, wherein the lights have different alignments so as to emit light in different directions.

12. The method of claim 10, wherein the sensor continuously detects the position of the person, with an activation of the lights being changeable in dependence on the continuously detected position.

13. The method of claim 10, wherein the lights are activated according to a defined time sequence.

14. The method of claim 13, wherein the lights are deactivated after 1-3 seconds.

15. The method of claim 10, wherein the lights are deactivated when a subsequent one of the lights is activated.

16. The method of claim 10, wherein the lights are installed in at least one vehicle structure selected from the group consisting of side mirror, door handle, and hatchback.

17. The method of claim 10, wherein the sensor is installed in at least one vehicle structure selected from the group consisting of side mirror, door handle, and hatchback.

18. The method of claim 10, wherein the lights are installed in a side mirror of the motor vehicle, while the sensor is installed in a door handle of the motor vehicle.

* * * * *